/

US010432582B2

(12) United States Patent
Rimmer et al.

(10) Patent No.: US 10,432,582 B2
(45) Date of Patent: Oct. 1, 2019

(54) TECHNOLOGIES FOR SCALABLE LOCAL ADDRESSING IN HIGH-PERFORMANCE NETWORK FABRICS

(71) Applicant: INTEL CORPORATION, Santa Clara, CA (US)

(72) Inventors: Todd M. Rimmer, Exton, PA (US); Albert S. Cheng, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/531,153

(22) PCT Filed: Dec. 27, 2014

(86) PCT No.: PCT/US2014/072460
§ 371 (c)(1),
(2) Date: May 26, 2017

(87) PCT Pub. No.: WO2016/105445
PCT Pub. Date: Jun. 30, 2016

(65) Prior Publication Data
US 2017/0339103 A1    Nov. 23, 2017

(51) Int. Cl.
*H04L 29/12*       (2006.01)
*H04L 12/64*       (2006.01)
(Continued)

(52) U.S. Cl.
CPC ...... *H04L 61/2069* (2013.01); *H04L 12/6418* (2013.01); *H04L 45/16* (2013.01);
(Continued)

(58) Field of Classification Search
CPC ....... H04L 45/16; H04L 45/74; H04L 47/125; H04L 61/2069
See application file for complete search history.

(56) References Cited

U.S. PATENT DOCUMENTS 6,654,834 B1   11/2003  Robertson et al.
6,801,985 B1   10/2004  Comisky et al.
(Continued)

FOREIGN PATENT DOCUMENTS

| EP | 2132917    | 6/2014  |
|----|------------|---------|
| GB | 2352144    | 1/2001  |
| WO | 2000-072421| 11/2000 |

OTHER PUBLICATIONS

International search report for PCT application No. PCT/US2014/072460, dated Sep. 24, 2015 (4 pages).
(Continued)

*Primary Examiner* — Jamal Javaid
(74) *Attorney, Agent, or Firm* — Barnes & Thornburg LLP

(57) ABSTRACT

Technologies for scalable local addressing include one or more managed network devices coupled to one or more computing nodes via high-speed fabric links. A computing node may transmit a data packet including a destination local identifier (DLID) that identifies the destination computing node. The DLID may be 32, 24, 20, or 16 bits wide. The managed network device may determine whether the DLID is within a configurable multicast address space and, if so, forward the data packet to a multicast group. The managed network device may also determine whether the DLID is within a configurable collective address space and, if so, perform a collective acceleration operation. The number of top-most bits set in a multicast mask and the number of additional top-most bits set in a collective mask may be configured. Multicast LIDs may be converted between different bit lengths. Other embodiments are described and claimed.

25 Claims, 4 Drawing Sheets

(51) Int. Cl.
   *H04L 12/761*  (2013.01)
   *H04L 12/931*  (2013.01)
   *H04L 29/06*   (2006.01)

(52) U.S. Cl.
   CPC ........ *H04L 49/358* (2013.01); *H04L 61/6095* (2013.01); *H04L 69/22* (2013.01)

(56) References Cited

U.S. PATENT DOCUMENTS

| | | |
   |---|---|---|
   | 7,680,142 B1 | 3/2010 | Tvete et al. |
   | 2005/0281196 A1 | 12/2005 | Tornetta |
   | 2006/0002385 A1 | 1/2006 | Johnsen et al. |
   | 2008/0122451 A1 | 5/2008 | Rumiantsev et al. |
   | 2009/0077268 A1* | 3/2009 | Craddock ........... H04L 12/1886 709/250 |
   | 2010/0111085 A1 | 5/2010 | Bauchot et al. |
   | 2013/0266009 A1 | 10/2013 | Colloff et al. |

OTHER PUBLICATIONS

Written opinion for PCT application No. PCT/US2014/072460, dated Sep. 24, 2015 (8 pages).
Extended European search report for European patent application No. 14909271, dated Jul. 18, 2018 (9 pages).
Extended European search report for European patent application No. 14909271, dated Aug. 18, 2018 (9 pages).
European Office action in European patent application No. 14909271, dated Jun. 26, 2019 (6 pages).

\* cited by examiner

TECHNOLOGIES FOR SCALABLE LOCAL ADDRESSING IN HIGH-PERFORMANCE NETWORK FABRICS

CROSS REFERENCE TO RELATED APPLICATIONS

The present application claims priority to and is a national stage entry under 35 USC § 371(b) of International Application No. PCT/US2014/072460, which was filed Dec. 27, 2014, entitled "TECHNOLOGIES FOR SCALABLE LOCAL ADDRESSING IN HIGH-PERFORMANCE NETWORK FABRICS."

BACKGROUND

High performance computing (HPC) clusters, cloud computing datacenters, and other large-scale computing networks may communicate over a high-speed input/output fabric such as an InfiniBand™ fabric. The InfiniBand™ architecture may transfer data using switched, point-to-point channels between endnodes. In the InfiniBand™ architecture, an endnode may be identified within a subnet using a 16-bit local identifier (LID). A fixed part of the 16-bit LID address space is dedicated to multicast addresses.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
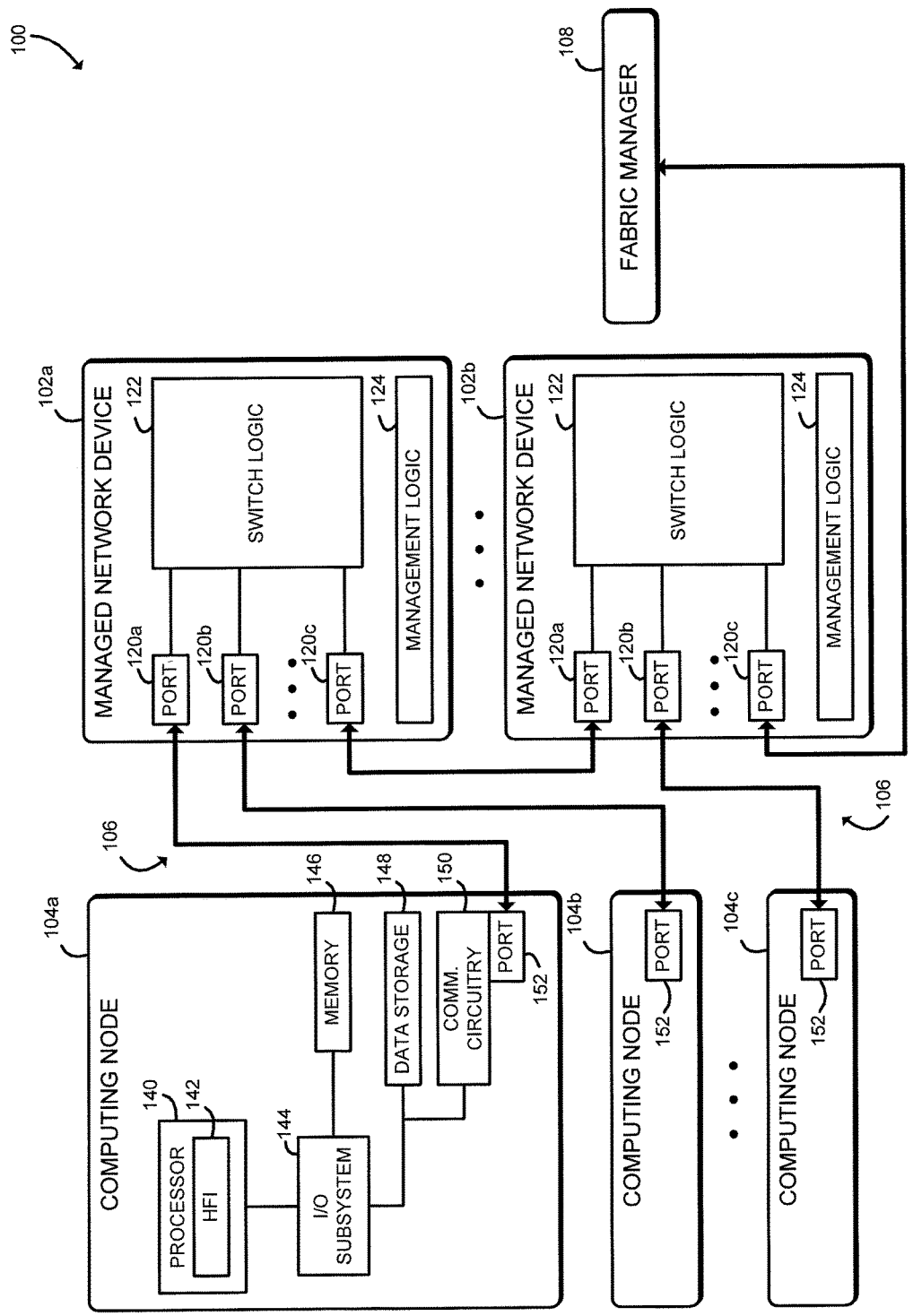
FIG. 1 is a simplified block diagram of at least one embodiment of a system for scalable local addressing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for scalable local addressing includes a number of managed network devices 102 and a number of computing nodes 104 communicating via several fabric links 106. The managed network devices 102, the computing nodes 104, and other attributes of the system 100 may be managed by one or more fabric managers 108. In use, as discussed in more detail below, each computing node 104 may transmit data packets over a fabric link 106 to a managed network device 102. Each data packet may include a local identifier (LID) that identifies a destination computing node 104 or multicast group of two or more computing nodes 104. The LID includes a varied number of bits of binary data (e.g., 16, 20, 24, or 32 bits). The managed network device 102 and the computing node 104 examine a varied number of bits of the LID to determine whether the data packet is addressed to a destination computing node 104 or a multicast group and forwards the data packet accordingly. In some embodiments, the managed network device 102 and the computing node 104 may also examine a varied number of bits of the LID to determine whether the data packet is addressed to a collective operation address space and, if so, perform an accelerated collective operation (e.g., broadcast, scatter, gather, etc.).

Although illustrated as including three computing nodes 104a through 104c and two managed network devices 102a and 102b, the system 100 may include many more managed network devices 102 and computing nodes 104. In particular, the system 100 may allow for local subnets to scale to include large number of computing nodes 104 beyond the amount that could be represented in a 16-bit InfiniBand™ LID. Additionally, rather than including a fixed multicast address space, the system 100 allows for configuration and control over the ratio of multicast addresses to unicast addresses, as well as over the ratio of multicast addresses to collective addresses. The system 100 also preserves contiguous address spaces for unicast, multicast, and collective addresses and may be interoperable with 16-bit Infini-Band™ installations.

Each managed network device 102 may be embodied as any network device capable of forwarding or controlling fabric traffic, such as a managed switch. The illustrative managed network device 102 includes a number of fabric ports 120, a switch logic 122, and a management logic 124. Each fabric port 120 may be connected to a fabric link 106, which in turn may be connected to a remote device such as a computing node 104 or another managed network device 102. The illustrative managed network device 102 includes three fabric ports 120a through 120c; however, in other embodiments the managed network device 102 may include additional or fewer ports 120 to support a different number of fabric links 106.

The switch logic 122 may be embodied as any hardware, firmware, software, or combination thereof configured to forward data packets received on the ports 120 to appropriate destination ports 120. For example, the switch logic 122 may be embodied as a shared memory switch or a crossbar switch, and may include a scheduler, packet processing pipeline, multicast forwarding tables, and/or any other switching logic. In some embodiments, the switch logic 122 may be embodied as one or more application-specific integrated circuits (ASICs).

The management logic 124 may be embodied as any control circuit, microprocessor, or other logic block that may be used to configure and control the managed network device 102. For example, the management logic 124 may initialize the managed network device 102 and its components, control the configuration of the managed network device 102 and its components, provide a testing interface to the managed network device 102, or provide other management functions. The management logic 124 may be configured by changing the values of a number of registers in a global register space. The fabric manager 108 may communicate with the management logic 124 using an in-band management interface by transmitting specially formatted management datagrams (MADs) over the fabric links 106. Additionally or alternatively, the management logic 124 may communicate with the fabric manager 108 over a management interface such as one or more PCI Express host interfaces, a test interface, or one or more low-speed interfaces such as an I2C interface, a JTAG interface, an SPI interface, an MDIO interface, an LED interface, or a GPIO interface.

Each computing node 104 may be embodied as any type of computation or computer device capable of performing the functions described herein, including, without limitation, a computer, a server, a rack-mounted server, a blade server, a network appliance, a web appliance, a multiprocessor system, a distributed computing system, a processor-based system, a mobile computing device, and/or a consumer electronic device. As shown in FIG. 1, each computing node 104 illustratively includes a processor 140, an input/output subsystem 144, a memory 146, a data storage device 148, and communication circuitry 150. Of course, the computing node 104 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 146, or portions thereof, may be incorporated in the processor 140 in some embodiments.

The processor 140 may be embodied as any type of processor capable of performing the functions described herein. For example, the processor 140 may be embodied as a single or multi-core processor(s), digital signal processor, microcontroller, or other processor or processing/controlling circuit. The processor 140 further includes a host fabric interface 142. The host fabric interface 142 may be embodied as any communication interface, such as a network interface controller, communication circuit, device, or collection thereof, capable of enabling communications between the processor 140 and other remote computing nodes 104 and/or other remote devices over the fabric links 106. The host fabric interface 142 may be configured to use any one or more communication technology and associated protocols (e.g., the Intel® Omni-Path Architecture) to effect such communication. Although illustrated as including a single processor 140, it should be understood that each computing node 104 may include multiple processors 140, and each processor 140 may include an integrated host fabric interface 142.

Similarly, the memory 146 may be embodied as any type of volatile or non-volatile memory or data storage capable of performing the functions described herein. In operation, the memory 146 may store various data and software used during operation of the computing node 104 such as operating systems, applications, programs, libraries, and drivers. The memory 146 is communicatively coupled to the processor 140 via the I/O subsystem 144, which may be embodied as circuitry and/or components to facilitate input/output operations with the processor 140, the memory 146, and other components of the computing node 104. For example, the I/O subsystem 144 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 144 may form a portion of a system-on-a-chip (SoC) and be incorporated, along with the processor 140, the memory 146, and other components of the computing node 104, on a single integrated circuit chip. The data storage device 148 may be embodied as any type of device or devices configured for short-term or long-term storage of data such as, for example, memory devices and circuits, memory cards, hard disk drives, solid-state drives, or other data storage devices.

The communication circuitry 150 of the computing node 104 may be embodied as any communication interface, such as a communication circuit, device, or collection thereof, capable of enabling communications between the computing node 104 and one or more remote computing nodes 104, managed network devices 102, switches, remote hosts, or other devices. The communication circuitry 150 may be configured to use any one or more communication technology (e.g., wired or wireless communications) and associated protocols (e.g., Intel® Omni-Path Architecture, Infini-Band®, Ethernet, Bluetooth®, Wi-Fi®, WiMAX, etc.) to effect such communication. In particular, the communication circuitry 150 includes a port 152 that connects to a fabric link 106. Although illustrated as including a single port 152, in some embodiments each computing node 104 may include multiple ports 152.

Each of the fabric links 106 may be embodied as any point-to-point communication link capable of connecting two ports 120, 152 of the system 100. For example, a fabric link 106 may connect a port 152 of a computing node 104 with a port 120 of a managed network device 102, may connect two ports 120 of two managed network devices 102, and so on. Each fabric link 106 allows communications in both directions. Each fabric link 106 may be embodied as a serial data communication link such as a copper cable, copper backplane, fiber optic cable, or silicon photonics link, and may include multiple communication lanes (e.g., four lanes) to increase total bandwidth. Each fabric link 106 may signal data at a wire speed such as 12.5 Gb/s or 25.78125 Gb/s.

The fabric manager 108 is configured to initialize and otherwise manage the managed network devices 102, computing nodes 104, and other hosts, gateways, and/or other devices of the system 100. The fabric manager 108 may be embodied as any type of server computing device, network device, or collection of devices, capable of performing the functions described herein. In some embodiments, the system 100 may include multiple fabric managers 108 of which a primary fabric manager 108 may be selected. As such, the fabric manager 108 may be embodied as a single server computing device or a collection of servers and associated devices. Accordingly, although the fabric manager 108 is illustrated in FIG. 1 as embodied as a single computing device, it should be appreciated that the fabric manager 108 may be embodied as multiple devices cooperating together to facilitate the functionality described below.

Figure 2:
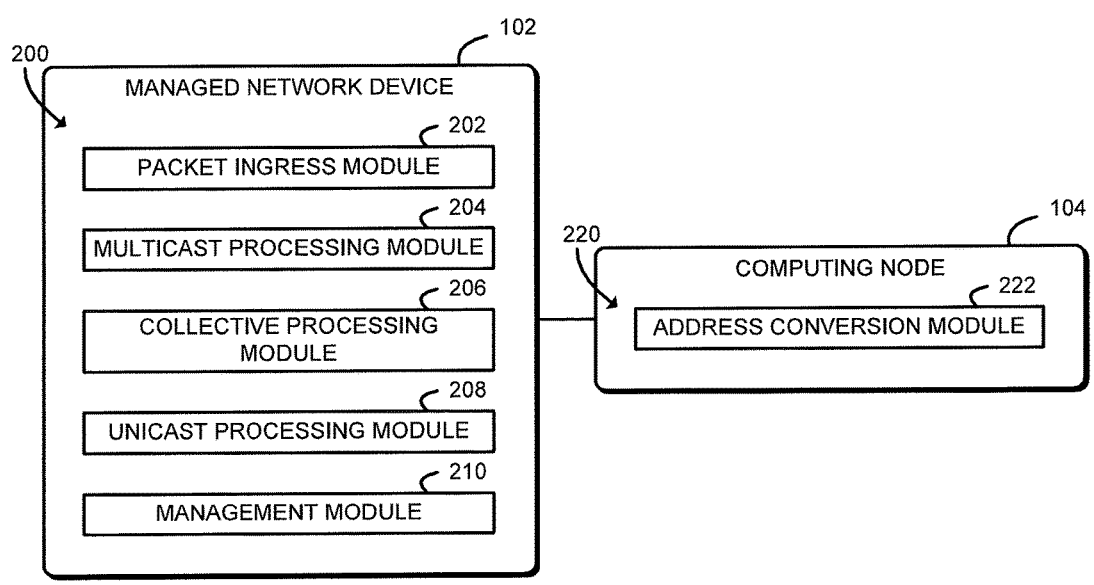
FIG. 2 is a simplified block diagram of at least one embodiment of various environments that may be established by the system of FIG. 1.

Referring now to FIG. 2, in an illustrative embodiment, each managed network device 102 establishes an environment 200 during operation. The illustrative environment 200 includes a packet ingress module 202, a multicast processing module 204, a collective processing module 206, a unicast processing module 208, and a management module 210. The various modules of the environment 200 may be embodied as hardware, firmware, software, or a combination thereof. For example the various modules, logic, and other components of the environment 200 may form a portion of, or otherwise be established by, the switch logic 122, the management logic 124, or other hardware components of the managed network device 102. As such, in some embodiments, any one or more of the modules of the environment 200 may be embodied as a circuit or collection of electrical devices (e.g., a packet ingress circuit, a multicast processing circuit, etc.).

The packet ingress module 202 is configured to receive and process data packets from the ports 120. In particular, the packet ingress module 202 is configured to extract a destination local identifier (DLID) from a received data packet. The DLID may be embodied as a binary value having a varied length (e.g., 32, 24, 20, or 16 bits wide, or any other appropriate width). The DLID identifies the destination end point or destination multicast group of the data packet.

The multicast processing module 204 is configured to compose a multicast mask and use the multicast mask to determine whether a data packet is included in the multicast address space. The multicast mask may be embodied as a binary value of the same width as the DLID, with a certain number of top-most bits set to define the multicast address space. The number of bits set (and therefore the size of the multicast address space) may be hard-coded or, in some embodiments, configurable. For example, in some embodiments the number of bits set may be configurable between one and seven bits. The multicast processing module 204 is further configured to forward data packets with DLIDs within the multicast address space to an appropriate multicast group.

The collective processing module 206 is configured to compose a collective mask and use the collective mask to determine whether a data packet is included in the collective address space. The collective mask may be embodied as a binary value of the same width as the DLID, with a certain number of top-most bits set to define the collective address space. The collective mask may have between zero and eight additional top-most bits set compared to the multicast mask; therefore, the collective address space may be embodied as an upper subset of the multicast address space. The number of additional bits set may be hard-coded or, in some embodiments, configurable. For example, in some embodiments, the number of additional bits set may be configurable between zero and seven bits. The collective processing module 206 is further configured to perform one or more collective acceleration operations for data packets with DLIDs within the collective address space.

The unicast processing module 208 is configured to forward data packets to a unicast address when the DLID of the data packet is not included in the multicast address space. For example, the unicast processing module 208 may determine an output port 120 associated with the unicast DLID and forward the data packet to that port 120.

The management module 210 is configured to manage the configuration of the managed network device 102. The management module 210 may store or otherwise manage one or more configuration registers that may be used to configure the managed network device 102. For example, in some embodiments, the management module 210 may manage a multicast mask configuration register that defines the size of the multicast address space and/or a collective mask configuration register that defines the size of the collective address space. The management module 210 may be configured to receive commands from or otherwise interface with the fabric manager 108.

Still referring to FIG. 2, in an illustrative embodiment, each computing node 104 establishes an environment 220 during operation. The illustrative environment 220 includes an address conversion module 222, which may be embodied as hardware, firmware, software, or a combination thereof. For example the various modules, logic, and other components of the environment 220 may form a portion of, or otherwise be established by, the processor 140 or other hardware components of the computing node 104. As such, in some embodiments, any one or more of the modules of the environment 220 may be embodied as a circuit or collection of electrical devices (e.g., an address conversion circuit, etc.).

The address conversion module 222 is configured to convert multicast LIDs between different bit widths. For example, the address conversion module 222 may convert 32-bit LIDs to 24-bit LIDs and so on. In particular, the address conversion module 222 is configured to compose a multicast mask for the original width of the LID and determine an offset of the LID using the multicast mask. The address conversion module 222 is further configured to compose a new multicast mask for the new width of the LID and combine the offset with the new multicast mask to generate the converted LID.

Figure 3:
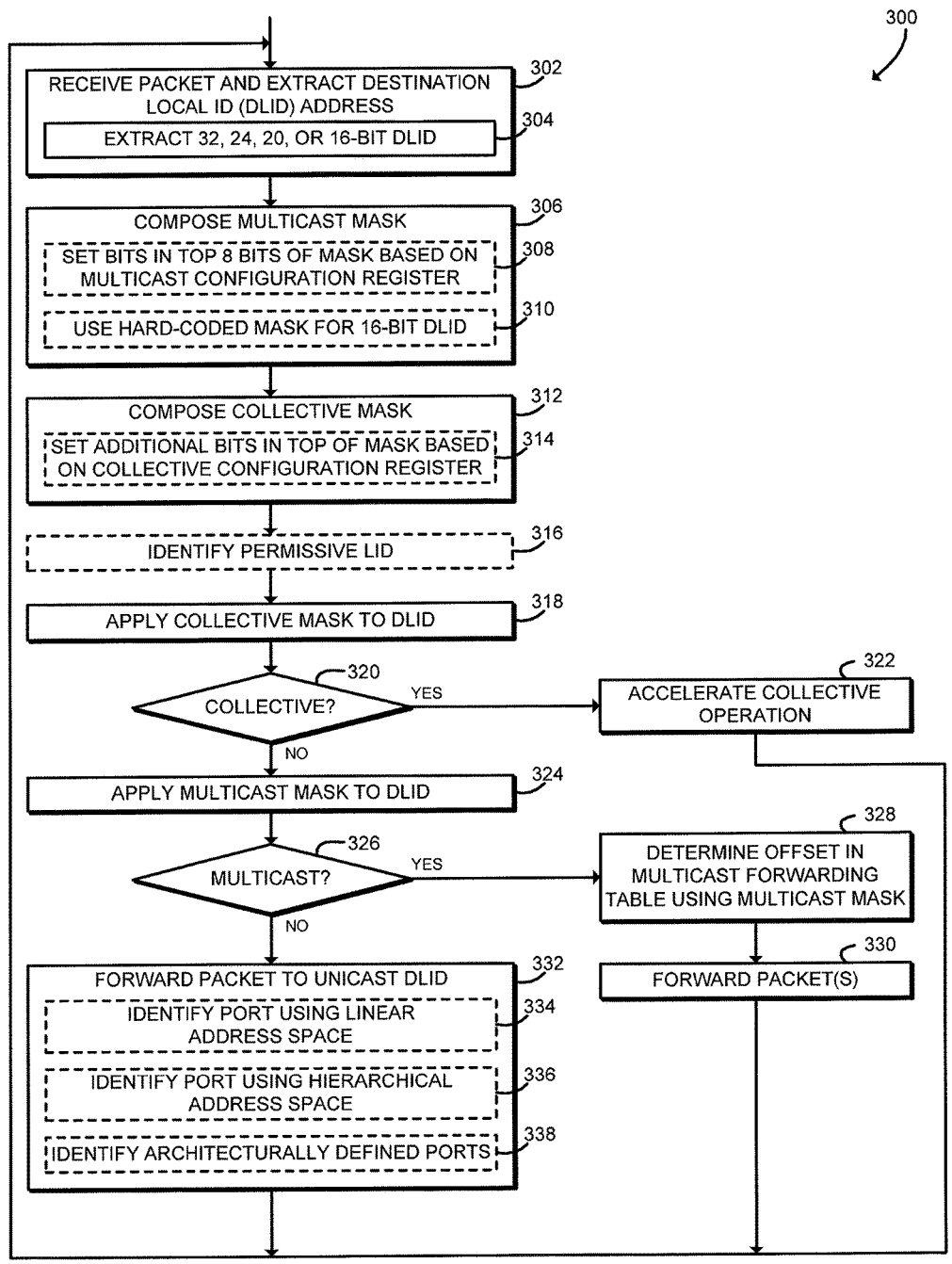
FIG. 3 is a simplified flow diagram of at least one embodiment of a method for data packet addressing and forwarding that may be executed by a managed network device of the system of FIGS. 1 and 2.

Referring now to FIG. 3, in use, a managed network device 102 may execute a method 300 for data packet addressing and forwarding. In some embodiments, a computing node 104 may execute some or all of the operations of the method 300. The method 300 begins in block 302, in which the managed network device 102 or the computing node 104 receives a data packet on a port 120 and extracts a destination local identifier (DLID) from the data packet. The data packet may be embodied as any appropriate collection of binary data including the DLID. In block 304, the managed network device 102 or the computing node 104 extracts a DLID that is 32, 24, 20, or 16 bits wide. The managed network device 102 or the computing node 104 may be configured to extract the correctly sized DLID, for example by the fabric manager 108. The width of the DLID may be configured globally for the managed network device 102 and/or on a per-port 120 basis.

In block 306, the managed network device 102 or the computing node 104 composes a multicast mask. The multicast mask is a binary value of the same width as the DLID (e.g., 32, 24, 20, or 16 bits wide). The multicast mask may be stored in a mask register or other storage location maintained by the managed network device 102 or the computing node 104. A certain number of the top bits in the multicast mask may be set, which establishes the multicast address space. For example, in some embodiments, for a 32, 24, or 20-bit multicast mask, the top four bits of the multicast mask may be set. In those embodiments, the multicast mask may thus be represented by the hexadecimal values 0xF0000000, 0xF00000, and 0xF0000, respectively. The multicast mask may be composed upon packet reception, or in some embodiments may be composed in advance of receipt of packet. If composed in advance, the managed network device 102 may maintain one pre-composed multicast mask for each LID width (e.g., 16, 20, 24, or 32 bits).

In some embodiments, in block 308, the managed network device 102 or the computing node 104 may set a configurable number of the top bits of the multicast mask (for example, in some embodiments up to eight bits) based on the contents of a multicast configuration register. The multicast configuration register may be embodied as a three-bit register, and may apply to the entire managed network device 102 or to a particular port 120. The multicast mask may include at least the top-most bit set, and up to seven additional bits set based on the value of the multicast configuration register. Thus, in embodiments including a three-bit multicast configuration register, the multicast address space may be configured to be between 1/2 (one bit set) and 1/256 (eight bits set) of the total address space. In some embodiments, in block 310 the managed network device 102 or the computing node 104 may use a hard-coded multicast mask for a 16-bit DLID. The multicast mask may be compatible with InfiniBand™ multicast addressing. For example, the multicast mask may have the top two bits set and may be represented by the hexadecimal value 0xC000.

In block 312, the managed network device 102 or the computing node 104 composes a collective mask. The collective mask is a binary value of the same width as the DLID (e.g., 32, 24, 20, or 16 bits wide). The collective mask may be stored in a mask register or other storage location maintained by the managed network device 102 or the computing node 104. A certain number of the top bits in the collective mask may be set, which establishes the collective address space. The collective address space is located at the top of the multicast address space. Thus, the collective address space may include at least as many set top bits as the multicast mask. In some embodiments, the collective mask may include one additional bit set compared to the multicast mask. For example, if the multicast mask includes four top bits set for the 32-, 24-, and 20-bit multicast masks, the collective masks may be represented by the hexadecimal values 0xF8000000, 0xF80000, and 0xF8000, respectively.

For a 16-bit multicast mask represented by 0xC000, the collective mask may be represented by the hexadecimal value 0xE000. The collective mask may be composed upon packet reception, or in some embodiments may be composed in advance of receipt of packet. If composed in advance, the managed network device 102 may maintain one pre-composed collective mask for each LID width (e.g., 16, 20, 24, or 32 bits).

In some embodiments, in block 314 the managed network device 102 or the computing node 104 may set a configurable number of additional top bits in the collective mask (for example, in some embodiments up to eight additional bits) based on the contents of a collective configuration register. The collective configuration register may be embodied as a three-bit register, and may apply to the entire managed network device 102 or the computing node 104 or to a particular port 120. Thus, in embodiments including a three-bit collective configuration register, the collective address space may be configured to be between 1/1 (no additional bits set) and 1/128 (seven additional bits set) of the multicast address space. Note that the managed network device 102 or the computing node 104 may use a configurable number of additional bits in the collective mask for DLIDs of any width (e.g. 32, 24, 20, or 16 bits).

In some embodiments, in block 316, the managed network device 102 or the computing node 104 may identify the DLID as a predefined Permissive LID. The Permissive LID may be used to indicate direct routing for certain subnet management packets. The Permissive LID address may be embodied as the top address in the address space (e.g., 0xFFFFFFFF, 0xFFFFFF, 0xFFFFF, or 0xFFFF for 32-, 24-, 20-, or 16-bit address spaces, respectively).

In block 318, the managed network device 102 or the computing node 104 applies the collective mask to the DLID. The managed network device 102 may perform any calculation, operation, or algorithm to determine whether the DLID is included in the collective address space defined by the collective mask. For example, the managed network device 102 or the computing node 104 may mask the upper eight bits of the DLID with the collective mask (e.g., using a bitwise AND operation), and then determine whether the result exactly matches the collective mask (e.g., using a bitwise XOR operation). As an illustration, to determine whether the DLID is included in the collective address space, the managed network device 102 or the computing node 104 may evaluate the equality expression described below in Equation 1.

$$(\text{DLID} \,\&\, \text{mask})\textasciicircum\text{mask}==0 \quad (1)$$

In block 320, the managed network device 102 or the computing node 104 determines whether the DLID is within the collective address space. If not, the method 300 advances to block 324, described below. If the DLID is within the collective address space, the method 300 branches to block 322, in which the managed network device 102 or the computing node 104 accelerates a collective operation. The managed network device 102 or the computing node 104 may, for example, perform an accelerated broadcast, scatter, gather, reduction, or synchronization operation. After performing the accelerated collective operation, the method 300 loops back to block 302 to continue processing data packets.

Referring back to block 320, if the DLID is not within the collective address space, the method 300 advances to block 324, in which the managed network device 102 or the computing node 104 applies the multicast mask to the DLID. The managed network device 102 or the computing node 104 may perform any calculation, operation, or algorithm to determine whether the DLID is included in the multicast address space defined by the multicast mask. For example, the managed network device 102 or the computing node 104 may mask the upper eight bits of the DLID with the multicast mask (e.g., using a bitwise AND operation), and then determine whether the result exactly matches the multicast mask (e.g., using a bitwise XOR operation). As an illustration, the managed network device 102 or the computing node 104 may evaluate the equality expression described above in Equation 1.

In block 326, the managed network device 102 or the computing node 104 determines whether the DLID is within the multicast address space. If not, the method 300 advances to block 332, described below. If the DLID is within the multicast address space, the method 300 branches to block 328, in which the managed network device 102 or the computing node 104 determines an offset of the DLID in a multicast forwarding table using the multicast mask. The managed network device 102 or the computing node 104 may determine the offset, for example, by performing a bitwise XOR operation of the multicast mask and the DLID. As an illustration, the managed network device 102 or the computing node 104 may evaluate the expression described below in Equation 2.

$$DLID \char`\^ mask \qquad (2)$$

In block 330, the managed network device 102 forwards the data packet to the multicast group identified by the DLID. For example, the managed network device 102 may look up a multicast group entry in the multicast forwarding table using the offset determined as described above in block 328. The multicast group entry may identify two or more ports 120 of the managed network device 102 included in the multicast group. For example, the multicast group entry may be embodied as a bitmap or other data identifying the ports 120. The managed network device 102 may then copy the data packet to each output port 120 (other than the port 120 on which the data packet was received). If the multicast offset exceeds the number of multicast resources on the managed network device 102, the collective resources may be used to perform multicast, in which case the value (offset−number of multicast entries in the managed network device 102) becomes the offset into the collective resources, and the given collective resource is used in a degraded mode to perform simple multicast. After forwarding the multicast packet, the method 300 loops back to block 302 to continue processing data packets.

Referring back to block 326, if the DLID is not within the multicast address space, the method 300 advances to block 332, in which the managed network device 102 forwards the data packet to a unicast DLID. In particular, the managed network device 102 may select an output port 120 and forward the data packet to that port 120. In some embodiments, in block 334, the managed network device 102 may identify the destination port 120 using a flat linear address space. For example, the managed network device 102 may maintain one or more forwarding tables mapping DLIDs to destination ports 120. In some embodiments, in block 336, the managed network device 102 may identify the destination port 120 using a hierarchical address space. In a hierarchical address space, the DLID may be subdivided into various fields (e.g., Group ID, Switch ID, Port Number, etc.). In some embodiments, in block 338, the managed network device 102 may identify one or more architecturally defined DLIDs and process the data packet accordingly. For example, in some embodiments, a predefined address may be used for uninitialized endpoint ports which have not been assigned an address, or to represent an invalid or undefined address. For example, the uninitialized address may be embodied as a zero address (e.g., 0x00000000, 0x000000, 0x00000, or 0x0000 for 32-, 24-, 20, or 16-bit address spaces, respectively). After forwarding the unicast data packet, the method 300 loops back to block 302 to continue processing data packets.

Although the method of 300 of FIG. 3 is illustrated as executing sequentially, it should be understood that in some embodiments, the managed network device 102 or the computing node 104 may perform the operations of the method 300 in parallel, simultaneously, or in any other order. For example, in some embodiments operations may be performed in parallel by hardware resources of the managed network device 102 or the computing node 104.

Figure 4:
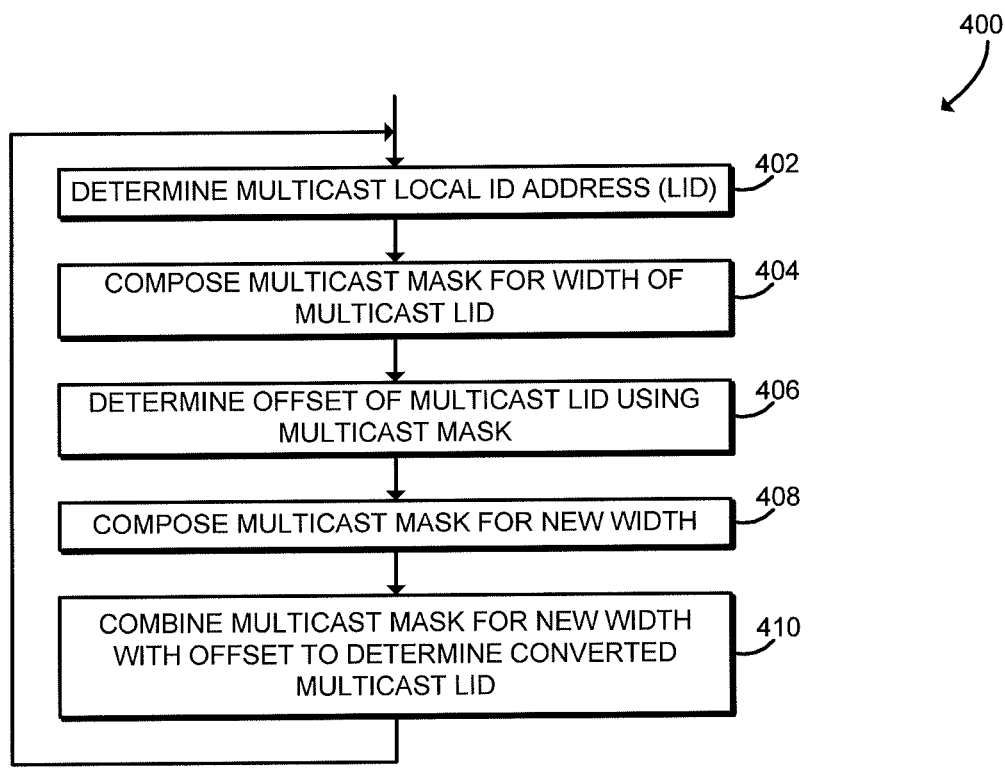
FIG. 4 is a simplified flow diagram of at least one embodiment of a method for local multicast address conversion that may be executed by a computing node of the system of FIGS. 1 and 2.

Referring now to FIG. 4, in use, a computing node 104 may execute a method 400 for converting multicast local identifiers (LIDs) between various bit widths. The computing node 104 may convert LIDs, for example, when writing out data packet headers. The method 400 begins in block 402, in which the computing node 104 determines a multicast LID. The multicast LID may be embodied as a binary value having a configurable length (e.g., 32, 24, 20, or 16 bits wide, or any other appropriate width). For example, in some embodiments, software entities executing on the computing node 104 may use 32-bit LIDs.

In block 404, the computing node 104 composes a multicast mask having the same width as the multicast LID (e.g., 32, 24, 20, or 16 bits). A certain number of the top bits in the multicast mask may be set, which establishes the multicast address space. For example, in some embodiments, for a 32, 24, or 20-bit multicast mask, the top four bits of the multicast mask may be set. In those embodiments, the multicast mask may thus be represented by the hexadecimal values 0xF0000000, 0xF00000, and 0xF0000, respectively. For a 16-bit multicast mask, the top two bits of the multicast mask may be set. In those embodiments, the multicast mask may be represented by the hexadecimal value 0xC000. In some embodiments, a configurable number of top bits of the multicast mask may be set. For example, in some embodiments, between one and seven top bits of the multicast mask may be set, meaning that in those embodiments the multicast address space may be configured to be between 1/2 (one bit set) and 1/128 (seven bits set) of the total address space.

In block 406, the computing node 104 determines an offset of the multicast LID using the multicast mask. The computing node 104 may determine the offset, for example, by performing a bitwise XOR operation of the multicast mask and the LID. As an illustration, the computing node 104 may evaluate the expression described above in Equation 2.

In block 408, the computing node 104 composes a new multicast mask for the new bit width. For example, when converting from a 32-bit LID used by software to a 24-, 20-, or 16-bit LID used by the fabric links 106, the computing node 104 may generate a 24-, 20-, or 16-bit wide multicast mask, respectively. The new multicast mask may have the same number of top bits set as the original multicast mask described above in connection with block 404. For example, when converting from a 32-bit LID to a 20-bit LID, the original multicast mask may be embodied as 0xF0000000, and the new multicast mask may be embodied as 0xF0000.

In block 410, the computing node 104 combines the new multicast mask for the new bit width with the LID offset to determine the converted multicast LID. For example, the computing node 104 may perform a bitwise OR operation to combine the new mask and the offset. As an illustration, the computing node 104 may evaluate the expression described below in Equation 3. After determining the converted multicast LID, the method 400 loops back to block 402, to continue converting multicast LIDs.

$$\text{new\_mask} | \text{offset} \quad (3)$$

EXAMPLES

Illustrative examples of the technologies disclosed herein are provided below. An embodiment of the technologies may include any one or more, and any combination of, the examples described below.

Example 1 includes a network device for data packet forwarding, the network device comprising a packet ingress module to extract a destination local identifier (DLID) from a data packet, wherein the DUD comprises a binary value having a first length; and a multicast processing module to compose a multicast mask, wherein the multicast mask comprises a binary value having the first length and wherein the multicast mask is indicative of an upper part of an address space of the DUD; determine whether the DUD is included in the upper part of the address space using the multicast mask; determine a multicast group as a function of the DUD in response to a determination that the DUD is included in the upper part of the address space; and forward the data packet to the multicast group in response to the determination that the DLID is included in the upper part of the address space.

Example 2 includes the subject matter of Example 1, and wherein the first length comprises 20 bits, 24 bits, or 32 bits.

Example 3 includes the subject matter of any of Examples 1 and 2, and wherein to compose the multicast mask comprises to determine a number of top-most bits of the multicast mask to set.

Example 4 includes the subject matter of any of Examples 1-3, and wherein to determine the number of top-most bits of the multicast mask to set comprises to determine the number of top-most bits based on a multicast mask configuration register of the network device.

Example 5 includes the subject matter of any of Examples 1-4, and wherein to compose the multicast mask comprises to compose a mask having four top-most bits set.

Example 6 includes the subject matter of any of Examples 1-5, and wherein to determine whether the DUD is included in the upper part of the address space using the multicast mask comprises to mask the DUD using the multicast mask to produce an intermediate value; and determine whether the multicast mask exactly matches the intermediate value.

Example 7 includes the subject matter of any of Examples 1-6, and wherein to mask the DLID using the multicast mask comprises to perform a bitwise AND operation on the multicast mask and the DLID to produce the intermediate value; and to determine whether the multicast mask exactly matches the intermediate value comprises to perform a bitwise XOR operation on the multicast mask and the intermediate value.

Example 8 includes the subject matter of any of Examples 1-7, and wherein to determine the multicast group as a function of the DUD comprises to perform a bitwise XOR operation on the multicast mask and the DLID to produce a multicast group index; and index a multicast group forwarding table using the multicast group index.

Example 9 includes the subject matter of any of Examples 1-8, and further comprising a collective processing module to compose a collective mask, wherein the collective mask comprises a binary value having the first length, and wherein the collective mask is indicative of a second upper part of the upper part of the address space of the DUD; determine whether the DLID is included in the second upper part of the address space using the collective mask; and perform a collective acceleration operation in response to a determination that the DUD is included in the second upper part of the address space.

Example 10 includes the subject matter of any of Examples 1-9, and wherein to compose the multicast mask comprises to determine a first number of top-most bits of the multicast mask to set; and to compose the collective mask comprises to (i) set the first number of top-most bits of the collective mask and (ii) determine an additional number of top-most bits of the collective mask to set.

Example 11 includes the subject matter of any of Examples 1-10, and wherein to determine the additional number of top-most bits of the collective mask to set comprises to determine the additional number of top-most bits based on a collective mask configuration register of the network device.

Example 12 includes the subject matter of any of Examples 1-11, and wherein to compose the multicast mask comprises to compose a mask having four top-most bits set; and to compose the collective mask comprises to compose a mask having five top-most bits set.

Example 13 includes the subject matter of any of Examples 1-12, and wherein the collective processing module is further to determine whether a multicast resource limit of the network device is exceeded; and use collective resources in a degraded mode as multicast resources in response to a determination that the multicast resource limit of the network device is exceeded.

Example 14 includes the subject matter of any of Examples 1-13, and wherein to determine whether the DUD is included in the second upper part of the address space using the collective mask comprises to mask the DLID using the collective mask to produce an intermediate value; and determine whether the collective mask exactly matches the intermediate value.

Example 15 includes the subject matter of any of Examples 1-14, and wherein to mask the DLID using the collective mask comprises to perform a bitwise AND operation on the collective mask and the DLID to produce the intermediate value; and to determine whether the collective mask exactly matches the intermediate value comprises to perform a bitwise XOR operation on the collective mask and the intermediate value.

Example 16 includes the subject matter of any of Examples 1-15, and wherein the first length comprises 16 bits, 20 bits, 24 bits, or 32 bits, and wherein to compose the multicast mask comprises to compose a mask having two top-most bits set if the first length is 16 bits; and to compose the multicast mask comprises to determine a number of top-most bits of the multicast mask to set based on a multicast mask configuration register of the network device if the first length is greater than 16 bits.

Example 17 includes the subject matter of any of Examples 1-16, and wherein the first length comprises 16 bits, 20 bits, 24 bits, or 32 bits, and wherein to compose the multicast mask comprises to compose a mask having two top-most bits set if the first length is 16 bits; and to compose the multicast mask comprises to compose a mask having four top-most bits set if the first length is greater than 16 bits.

Example 18 includes the subject matter of any of Examples 1-17, and further comprising a unicast processing module to forward the data packet to a unicast address in response to a determination that the DLID is not included in the upper part of the address space.

Example 19 includes a computing device for converting multicast addresses, the computing device comprising an address conversion module to determine a multicast local identifier (LID), wherein the LID comprises a binary value having a first length; compose a multicast mask, wherein the multicast mask comprises a binary value having the first length and wherein the multicast mask is indicative of an upper part of an address space of the LID; determine an offset of the LID using the multicast mask; compose a second multicast mask, wherein the second multicast mask comprises a binary value having a second length; and combine the second multicast mask and the offset of the LID to produce a second LID, wherein the second LID comprises a binary value having the second length, and wherein the second multicast mask is indicative of an upper part of an address space of the second LID.

Example 20 includes the subject matter of Example 19, and wherein the first length comprises 16 bits, 20 bits, 24 bits, or 32 bits; the second length comprises 16 bits, 20 bits, 24 bits, or 32 bits; and the first length does not equal the second length.

Example 21 includes the subject matter of any of Examples 19 and 20, and wherein the first length comprises 32 bits; and the second length comprises 16 bits, 20 bits, or 24 bits.

Example 22 includes the subject matter of any of Examples 19-21, and wherein to compose the multicast mask comprises to set a first number of top-most bits of the multicast mask; and to compose the second multicast mask comprises to set the first number of top-most bits of the second multicast mask.

Example 23 includes the subject matter of any of Examples 19-22, and wherein to determine the offset of the LID using the multicast mask comprises to perform a bitwise XOR operation on the LID and the multicast mask to produce the offset of the LID.

Example 24 includes the subject matter of any of Examples 19-23, and wherein to combine the second multicast mask and the offset of the LID to produce the second LID comprises to perform a bitwise OR operation on the second multicast mask and the offset of the LID to produce the second LID.

Example 25 includes a method for data packet forwarding, the method comprising extracting, by a network device, a destination local identifier (DLID) from a data packet, wherein the DLID comprises a binary value having a first length; composing, by the network device, a multicast mask, wherein the multicast mask comprises a binary value having the first length and wherein the multicast mask is indicative of an upper part of an address space of the DLID; determining, by the network device, whether the DLID is included in the upper part of the address space using the multicast mask; determining, by the network device, a multicast group as a function of the DLID in response to determining that the DLID is included in the upper part of the address space; and forwarding, by the network device, the data packet to the multicast group in response to determining that the DLID is included in the upper part of the address space.

Example 26 includes the subject matter of Example 25, and wherein the first length comprises 20 bits, 24 bits, or 32 bits.

Example 27 includes the subject matter of any of Examples 25 and 26, and wherein composing the multicast mask comprises determining a number of top-most bits of the multicast mask to set.

Example 28 includes the subject matter of any of Examples 25-27, and wherein determining the number of top-most bits of the multicast mask to set comprises determining the number of top-most bits based on a multicast mask configuration register of the network device.

Example 29 includes the subject matter of any of Examples 25-28, and wherein composing the multicast mask comprises composing a mask having four top-most bits set.

Example 30 includes the subject matter of any of Examples 25-29, and wherein determining whether the DLID is included in the upper part of the address space using the multicast mask comprises masking the DLID using the multicast mask to produce an intermediate value; and determining whether the multicast mask exactly matches the intermediate value.

Example 31 includes the subject matter of any of Examples 25-30, and wherein masking the DLID using the multicast mask comprises performing a bitwise AND operation on the multicast mask and the DLID to produce the intermediate value; and determining whether the multicast mask exactly matches the intermediate value comprises performing a bitwise XOR operation on the multicast mask and the intermediate value.

Example 32 includes the subject matter of any of Examples 25-31, and wherein determining the multicast group as a function of the DLID comprises performing a bitwise XOR operation on the multicast mask and the DLID to produce a multicast group index; and indexing a multicast group forwarding table using the multicast group index.

Example 33 includes the subject matter of any of Examples 25-32, and further comprising composing, by the network device, a collective mask, wherein the collective mask comprises a binary value having the first length, and wherein the collective mask is indicative of a second upper part of the upper part of the address space of the DLID; determining, by the network device, whether the DLID is included in the second upper part of the address space using the collective mask; and performing, by the network device, a collective acceleration operation in response to determining that the DLID is included in the second upper part of the address space.

Example 34 includes the subject matter of any of Examples 25-33, and wherein composing the multicast mask comprises determining a first number of top-most bits of the multicast mask to set; and composing the collective mask comprises (i) setting the first number of top-most bits of the collective mask and (ii) determining an additional number of top-most bits of the collective mask to set.

Example 35 includes the subject matter of any of Examples 25-34, and wherein determining the additional number of top-most bits of the collective mask to set comprises determining the additional number of top-most bits based on a collective mask configuration register of the network device.

Example 36 includes the subject matter of any of Examples 25-35, and wherein composing the multicast mask comprises composing a mask having four top-most bits set; and composing the collective mask comprises composing a mask having five top-most bits set.

Example 37 includes the subject matter of any of Examples 25-36, and further comprising determining, by the network device, whether a multicast resource limit of the network device is exceeded; and using, by the network device, collective resources in a degraded mode as multicast resources in response to determining that the multicast resource limit of the network device is exceeded.

Example 38 includes the subject matter of any of Examples 25-37, and wherein determining whether the DLID is included in the second upper part of the address space using the collective mask comprises masking the DLID using the collective mask to produce an intermediate value; and determining whether the collective mask exactly matches the intermediate value.

Example 39 includes the subject matter of any of Examples 25-38, and wherein masking the DLID using the collective mask comprises performing a bitwise AND operation on the collective mask and the DLID to produce the intermediate value; and determining whether the collective mask exactly matches the intermediate value comprises performing a bitwise XOR operation on the collective mask and the intermediate value.

Example 40 includes the subject matter of any of Examples 25-39, and wherein the first length comprises 16 bits, 20 bits, 24 bits, or 32 bits, and wherein composing the multicast mask comprises composing a mask having two top-most bits set if the first length is 16 bits; and composing the multicast mask comprises determining a number of top-most bits of the multicast mask to set based on a multicast mask configuration register of the network device if the first length is greater than 16 bits.

Example 41 includes the subject matter of any of Examples 25-40, and wherein the first length comprises 16 bits, 20 bits, 24 bits, or 32 bits, and wherein composing the multicast mask comprises composing a mask having two top-most bits set if the first length is 16 bits; and composing the multicast mask comprises composing a mask having four top-most bits set if the first length is greater than 16 bits.

Example 42 includes the subject matter of any of Examples 25-41, and further comprising forwarding, by the network device, the data packet to a unicast address in response to determining that the DLID is not included in the upper part of the address space.

Example 43 includes a method for converting multicast addresses, the method comprising determining, by a computing device, a multicast local identifier (LID), wherein the LID comprises a binary value having a first length; composing, by the computing device, a multicast mask, wherein the multicast mask comprises a binary value having the first length and wherein the multicast mask is indicative of an upper part of an address space of the LID; determining, by the computing device, an offset of the LID using the multicast mask; composing, by the computing device, a second multicast mask, wherein the second multicast mask comprises a binary value having a second length; and combining, by the computing device, the second multicast mask and the offset of the LID to produce a second LID, wherein the second LID comprises a binary value having the second length, and wherein the second multicast mask is indicative of an upper part of an address space of the second LID.

Example 44 includes the subject matter of Example 43, and wherein the first length comprises 16 bits, 20 bits, 24 bits, or 32 bits; the second length comprises 16 bits, 20 bits, 24 bits, or 32 bits; and the first length does not equal the second length.

Example 45 includes the subject matter of any of Examples 43 and 44, and wherein the first length comprises 32 bits; and the second length comprises 16 bits, 20 bits, or 24 bits.

Example 46 includes the subject matter of any of Examples 43-45, and wherein composing the multicast mask comprises setting a first number of top-most bits of the multicast mask; and composing the second multicast mask comprises setting the first number of top-most bits of the second multicast mask.

Example 47 includes the subject matter of any of Examples 43-46, and wherein determining the offset of the LID using the multicast mask comprises performing a bitwise XOR operation on the LID and the multicast mask to produce the offset of the LID.

Example 48 includes the subject matter of any of Examples 43-47, and wherein combining the second multicast mask and the offset of the LID to produce the second LID comprises performing a bitwise OR operation on the second multicast mask and the offset of the LID to produce the second LID.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a network device for data packet forwarding, the network device comprising means for extracting a destination local identifier (DLID) from a data packet, wherein the DLID comprises a binary value having a first length; means for composing a multicast mask, wherein the multicast mask comprises a binary value having the first length and wherein the multicast mask is indicative of an upper part of an address space of the DLID; means for determining whether the DLID is included in the upper part of the address space using the multicast mask; means for determining a multicast group as a function of the DLID in response to determining that the DLID is included in the upper part of the address space; and means for forwarding the data packet to the multicast group in response to determining that the DLID is included in the upper part of the address space.

Example 53 includes the subject matter of Example 52, and wherein the first length comprises 20 bits, 24 bits, or 32 bits.

Example 54 includes the subject matter of any of Examples 52 and 53, and wherein the means for composing the multicast mask comprises means for determining a number of top-most bits of the multicast mask to set.

Example 55 includes the subject matter of any of Examples 52-54, and wherein the means for determining the number of top-most bits of the multicast mask to set comprises means for determining the number of top-most bits based on a multicast mask configuration register of the network device.

Example 56 includes the subject matter of any of Examples 52-55, and wherein the means for composing the multicast mask comprises means for composing a mask having four top-most bits set.

Example 57 includes the subject matter of any of Examples 52-56, and wherein the means for determining whether the DLID is included in the upper part of the address space using the multicast mask comprises: means for masking the DLID using the multicast mask to produce an intermediate value; and means for determining whether the multicast mask exactly matches the intermediate value.

Example 58 includes the subject matter of any of Examples 52-57, and wherein the means for masking the DLID using the multicast mask comprises means for performing a bitwise AND operation on the multicast mask and the DLID to produce the intermediate value; and the means for determining whether the multicast mask exactly matches the intermediate value comprises means for performing a bitwise XOR operation on the multicast mask and the intermediate value.

Example 59 includes the subject matter of any of Examples 52-58, and wherein the means for determining the multicast group as a function of the DLID comprises: means for performing a bitwise XOR operation on the multicast mask and the DLID to produce a multicast group index; and means for indexing a multicast group forwarding table using the multicast group index.

Example 60 includes the subject matter of any of Examples 52-59, and further comprising means for composing a collective mask, wherein the collective mask comprises a binary value having the first length, and wherein the collective mask is indicative of a second upper part of the upper part of the address space of the DLID; means for determining whether the DLID is included in the second upper part of the address space using the collective mask; and means for performing a collective acceleration operation in response to determining that the DLID is included in the second upper part of the address space.

Example 61 includes the subject matter of any of Examples 52-60, and wherein the means for composing the multicast mask comprises means for determining a first number of top-most bits of the multicast mask to set; and the means for composing the collective mask comprises (i) means for setting the first number of top-most bits of the collective mask and (ii) means for determining an additional number of top-most bits of the collective mask to set.

Example 62 includes the subject matter of any of Examples 52-61, and wherein the means for determining the additional number of top-most bits of the collective mask to set comprises means for determining the additional number of top-most bits based on a collective mask configuration register of the network device.

Example 63 includes the subject matter of any of Examples 52-62, and wherein the means for composing the multicast mask comprises means for composing a mask having four top-most bits set; and the means for composing the collective mask comprises means for composing a mask having five top-most bits set.

Example 64 includes the subject matter of any of Examples 52-63, and further comprising means for determining whether a multicast resource limit of the network device is exceeded; and means for using collective resources in a degraded mode as multicast resources in response to determining that the multicast resource limit of the network device is exceeded.

Example 65 includes the subject matter of any of Examples 52-64, and wherein the means for determining whether the DLID is included in the second upper part of the address space using the collective mask comprises means for masking the DLID using the collective mask to produce an intermediate value; and means for determining whether the collective mask exactly matches the intermediate value.

Example 66 includes the subject matter of any of Examples 52-65, and wherein the means for masking the DLID using the collective mask comprises means for performing a bitwise AND operation on the collective mask and the DLID to produce the intermediate value; and the means for determining whether the collective mask exactly matches the intermediate value comprises means for performing a bitwise XOR operation on the collective mask and the intermediate value.

Example 67 includes the subject matter of any of Examples 52-66, and wherein the first length comprises 16 bits, 20 bits, 24 bits, or 32 bits, and wherein the means for composing the multicast mask comprises means for composing a mask having two top-most bits set if the first length is 16 bits; and the means for composing the multicast mask comprises means for determining a number of top-most bits of the multicast mask to set based on a multicast mask configuration register of the network device if the first length is greater than 16 bits.

Example 68 includes the subject matter of any of Examples 52-67, and wherein the first length comprises 16 bits, 20 bits, 24 bits, or 32 bits, and wherein the means for composing the multicast mask comprises means for composing a mask having two top-most bits set if the first length is 16 bits; and the means for composing the multicast mask comprises means for composing a mask having four top-most bits set if the first length is greater than 16 bits.

Example 69 includes the subject matter of any of Examples 52-68, and further comprising means for forwarding the data packet to a unicast address in response to determining that the DLID is not included in the upper part of the address space.

Example 70 includes a computing device for converting multicast addresses, the computing device comprising means for determining a multicast local identifier (LID), wherein the LID comprises a binary value having a first length; means for composing a multicast mask, wherein the multicast mask comprises a binary value having the first length and wherein the multicast mask is indicative of an upper part of an address space of the LID; means for determining an offset of the LID using the multicast mask; means for composing a second multicast mask, wherein the second multicast mask comprises a binary value having a second length; and means for combining the second multicast mask and the offset of the LID to produce a second LID, wherein the second LID comprises a binary value having the second length, and wherein the second multicast mask is indicative of an upper part of an address space of the second LID.

Example 71 includes the subject matter of Example 70, and wherein the first length comprises 16 bits, 20 bits, 24 bits, or 32 bits; the second length comprises 16 bits, 20 bits, 24 bits, or 32 bits; and the first length does not equal the second length.

Example 72 includes the subject matter of any of Examples 70 and 71, and wherein the first length comprises 32 bits; and the second length comprises 16 bits, 20 bits, or 24 bits.

Example 73 includes the subject matter of any of Examples 70-72, and wherein the means for composing the multicast mask means for comprises setting a first number of top-most bits of the multicast mask; and the means for composing the second multicast mask comprises means for setting the first number of top-most bits of the second multicast mask.

Example 74 includes the subject matter of any of Examples 70-73, and wherein the means for determining the offset of the LID using the multicast mask comprises means for performing a bitwise XOR operation on the LID and the multicast mask to produce the offset of the LID.

Example 75 includes the subject matter of any of Examples 70-74, and wherein the means for combining the second multicast mask and the offset of the LID to produce the second LID comprises means for performing a bitwise OR operation on the second multicast mask and the offset of the LID to produce the second LID.

What is claimed is:

1. A network device for data packet forwarding, the network device comprising:
   a packet ingress module to extract a destination local identifier (DUD) from a data packet, wherein the DUD comprises a binary value having a first length; and
   a multicast processing module to:
   compose a multicast mask, wherein the multicast mask comprises a binary value having the first length and wherein the multicast mask is indicative of an upper part of an address space of the DLID;
   determine whether the DLID is included in the upper part of the address space using the multicast mask;
   determine a multicast group as a function of the DUD in response to a determination that the DLID is included in the upper part of the address space; and
   forward the data packet to the multicast group in response to the determination that the DLID is included in the upper part of the address space.

2. The network device of claim 1, wherein the first length comprises 20 bits, 24 bits, or 32 bits.

3. The network device of claim 1, wherein to compose the multicast mask comprises to determine a number of top-most bits of the multicast mask to set.

4. The network device of claim 3, wherein to determine the number of top-most bits of the multicast mask to set comprises to determine the number of top-most bits based on a multicast mask configuration register of the network device.

5. The network device of claim 1, wherein to compose the multicast mask comprises to compose a mask having four top-most bits set.

6. The network device of claim 1, wherein to determine the multicast group as a function of the DLID comprises to:
   perform a bitwise XOR operation on the multicast mask and the DLID to produce a multicast group index; and
   index a multicast group forwarding table using the multicast group index.

7. The network device of claim 1, further comprising a collective processing module to:
   compose a collective mask, wherein the collective mask comprises a binary value having the first length, and wherein the collective mask is indicative of a second upper part of the upper part of the address space of the DLID;
   determine whether the DLID is included in the second upper part of the address space using the collective mask; and
   perform a collective acceleration operation in response to a determination that the DLID is included in the second upper part of the address space.

8. The network device of claim 7, wherein:
   to compose the multicast mask comprises to determine a first number of top-most bits of the multicast mask to set; and
   to compose the collective mask comprises to (i) set the first number of top-most bits of the collective mask and (ii) determine an additional number of top-most bits of the collective mask to set.

9. The network device of claim 8, wherein to determine the additional number of top-most bits of the collective mask to set comprises to determine the additional number of top-most bits based on a collective mask configuration register of the network device.

10. The network device of claim 7, wherein:
    to compose the multicast mask comprises to compose a mask having four top-most bits set; and
    to compose the collective mask comprises to compose a mask having five top-most bits set.

11. The network device of claim 1, wherein the first length comprises 16 bits, 20 bits, 24 bits, or 32 bits, and wherein:
    to compose the multicast mask comprises to compose a mask having two top-most bits set if the first length is 16 bits; and
    to compose the multicast mask comprises to determine a number of top-most bits of the multicast mask to set based on a multicast mask configuration register of the network device if the first length is greater than 16 bits.

12. A method for data packet forwarding, the method comprising:
    extracting, by a network device, a destination local identifier (DLID) from a data packet, wherein the DLID comprises a binary value having a first length;
    composing, by the network device, a multicast mask, wherein the multicast mask comprises a binary value having the first length and wherein the multicast mask is indicative of an upper part of an address space of the DLID;
    determining, by the network device, whether the DLID is included in the upper part of the address space using the multicast mask;
    determining, by the network device, a multicast group as a function of the DLID in response to determining that the DLID is included in the upper part of the address space; and
    forwarding, by the network device, the data packet to the multicast group in response to determining that the DLID is included in the upper part of the address space.

13. The method of claim 12, wherein the first length comprises 20 bits, 24 bits, or 32 bits.

14. The method of claim 12, wherein composing the multicast mask comprises determining a number of top-most bits of the multicast mask to set.

15. The method of claim 12, wherein determining the multicast group as a function of the DLID comprises:
    performing a bitwise XOR operation on the multicast mask and the DLID to produce a multicast group index; and
    indexing a multicast group forwarding table using the multicast group index.

16. The method of claim 12, further comprising:
    composing, by the network device, a collective mask, wherein the collective mask comprises a binary value having the first length, and wherein the collective mask is indicative of a second upper part of the upper part of the address space of the DLID;
    determining, by the network device, whether the DLID is included in the second upper part of the address space using the collective mask; and
    performing, by the network device, a collective acceleration operation in response to determining that the DLID is included in the second upper part of the address space.

17. The method of claim 16, wherein:
    composing the multicast mask comprises determining a first number of top-most bits of the multicast mask to set; and composing the collective mask comprises (i) setting the first number of top-most bits of the collective mask and (ii) determining an additional number of top-most bits of the collective mask to set.

18. The method of claim 12, wherein the first length comprises 16 bits, 20 bits, 24 bits, or 32 bits, and wherein:
   composing the multicast mask comprises composing a mask having two top-most bits set if the first length is 16 bits; and
   composing the multicast mask comprises determining a number of top-most bits of the multicast mask to set based on a multicast mask configuration register of the network device if the first length is greater than 16 bits.

19. One or more non-transitory, computer-readable storage media comprising a plurality of instructions that in response to being executed cause a network device to:
   extract a destination local identifier (DLID) from a data packet, wherein the DLID comprises a binary value having a first length;
   compose a multicast mask, wherein the multicast mask comprises a binary value having the first length and wherein the multicast mask is indicative of an upper part of an address space of the DLID;
   determine whether the DLID is included in the upper part of the address space using the multicast mask;
   determine a multicast group as a function of the DLID in response to determining that the DLID is included in the upper part of the address space; and
   forward the data packet to the multicast group in response to determining that the DLID is included in the upper part of the address space.

20. The one or more non-transitory, computer-readable storage media of claim 19, wherein the first length comprises 20 bits, 24 bits, or 32 bits.

21. The one or more non-transitory, computer-readable storage media of claim 19, wherein to compose the multicast mask comprises to determine a number of top-most bits of the multicast mask to set.

22. The one or more non-transitory, computer-readable storage media of claim 19, wherein to determine the multicast group as a function of the DLID comprises to:
   perform a bitwise XOR operation on the multicast mask and the DLID to produce a multicast group index; and
   index a multicast group forwarding table using the multicast group index.

23. The one or more non-transitory, computer-readable storage media of claim 19, further comprising a plurality of instructions that in response to being executed cause the network device to:
   compose a collective mask, wherein the collective mask comprises a binary value having the first length, and wherein the collective mask is indicative of a second upper part of the upper part of the address space of the DLID;
   determine whether the DLID is included in the second upper part of the address space using the collective mask; and
   perform a collective acceleration operation in response to determining that the DLID is included in the second upper part of the address space.

24. The one or more non-transitory, computer-readable storage media of claim 23, wherein:
   to compose the multicast mask comprises to determine a first number of top-most bits of the multicast mask to set; and
   to compose the collective mask comprises to (i) set the first number of top-most bits of the collective mask and (ii) determine an additional number of top-most bits of the collective mask to set.

25. The one or more non-transitory, computer-readable storage media of claim 19, wherein the first length comprises 16 bits, 20 bits, 24 bits, or 32 bits, and wherein:
   to compose the multicast mask comprises to compose a mask having two top-most bits set if the first length is 16 bits; and
   to compose the multicast mask comprises to determine a number of top-most bits of the multicast mask to set based on a multicast mask configuration register of the network device if the first length is greater than 16 bits.

* * * * *